US009140309B2

(12) United States Patent
Lawrence et al.

(10) Patent No.: US 9,140,309 B2
(45) Date of Patent: *Sep. 22, 2015

(54) TWO-SPEED CLUTCH AND KIT (71) Applicant: Horton, Inc., Roseville, MN (US)

(72) Inventors: Brian T. Lawrence, Harris, MN (US);
Michael J. Bieber, Lakeville, MN (US);
John Philip Cinq-Mars, Brooklyn Park, MN (US)

(73) Assignee: Horton, Inc., Roseville, MN (US)

( * ) Notice: Subject to any disclaimer, the term of this patent is extended or adjusted under 35 U.S.C. 154(b) by 96 days.

This patent is subject to a terminal disclaimer.

(21) Appl. No.: 13/974,805

(22) Filed: Aug. 23, 2013

(65) Prior Publication Data

US 2014/0069762 A1  Mar. 13, 2014

Related U.S. Application Data (63) Continuation of application No. 13/124,760, filed as application No. PCT/US2009/064168 on Nov. 12, 2009, now Pat. No. 8,544,627.

(60) Provisional application No. 61/198,965, filed on Nov. 12, 2008, provisional application No. 61/210,394, filed on Mar. 18, 2009.

(51) Int. Cl.
F16D 29/00 (2006.01)
F16D 13/58 (2006.01)
F16D 27/00 (2006.01)
F16D 27/01 (2006.01)
F16D 27/14 (2006.01)

(52) U.S. Cl.
CPC .............. *F16D 13/58* (2013.01); *F16D 27/004* (2013.01); *F16D 27/01* (2013.01); *F16D 27/14* (2013.01); *Y10T 29/49105* (2015.01); *Y10T 29/49716* (2015.01)

(58) Field of Classification Search
CPC ...... H01K 49/043; H01K 49/04; F16D 27/01; F16D 29/00
USPC ..................................................... 310/156.13
See application file for complete search history.

(56) References Cited

U.S. PATENT DOCUMENTS 726,536 A  4/1903  Holz
900,397 A  10/1908  Lange
(Continued)

FOREIGN PATENT DOCUMENTS

CH  390375 A  4/1965
DE  671285   1/1939
(Continued)

OTHER PUBLICATIONS

Kit Masters, "2-Speed Conversion Kits" (2 pages) (2008).
Linnig Trucktec Gmbh, "Kupplungen der LT Produktfamilie—Clutches of the LT Product Family" (1 page).
Concepts NREC, "Kysor 2-Speed Kit Instructions—Directions to install Kysor 2-speed Kit" (1 page) (2008).
(Continued)

*Primary Examiner* — Rodney H Bonck
(74) *Attorney, Agent, or Firm* — Kinney & Lange, P.A.

(57) ABSTRACT

A magnet holder assembly suitable for use as an eddy current drive of a clutch includes magnet holder means for securing one or more magnets to a rotatable component of the clutch, a first permanent magnet radially retained by the magnet holder means, wherein the first permanent magnet has a beveled edge configured to mate with the magnet holder means, and a second permanent magnet radially retained by the magnet holder means. The first permanent magnet and the second permanent magnet have magnetic orientations arranged substantially opposite one another.

19 Claims, 6 Drawing Sheets

(56) References Cited

U.S. PATENT DOCUMENTS

| | | |
|---|---|---|
| 1,136,279 A | 4/1915 | Severy |
| 1,306,784 A | 6/1919 | Soames et al. |
| 1,371,391 A | 3/1921 | Ollard |
| 1,556,427 A | 10/1925 | Coughtry |
| 1,742,804 A | 1/1930 | Carhart |
| 1,742,805 A | 1/1930 | Carhart |
| 1,827,348 A | 10/1931 | Bing |
| 1,935,581 A | 11/1933 | Snow, Jr. |
| 2,221,014 A | 11/1940 | Williamson |
| 2,232,454 A | 2/1941 | Haupt |
| 2,241,242 A | 5/1941 | Friedman |
| 2,259,461 A | 10/1941 | Eason |
| 2,317,135 A | 4/1943 | Crittenden et al. |
| 2,437,871 A | 3/1948 | Wood |
| 2,470,596 A | 5/1949 | Winther et al. |
| 2,488,079 A | 11/1949 | Lavaud et al. |
| 2,519,449 A | 8/1950 | Findley |
| 2,581,637 A | 1/1952 | Danly et al. |
| 2,597,388 A | 5/1952 | Lavaud |
| 2,606,948 A | 8/1952 | Jaeschke |
| 2,658,593 A | 11/1953 | Doebeli |
| 2,661,148 A | 12/1953 | Englander |
| 2,679,604 A | 5/1954 | Jaeschke |
| 2,714,437 A | 8/1955 | Spase |
| 2,732,921 A | 1/1956 | Rabinow |
| 2,769,932 A | 11/1956 | Zozulin et al. |
| 2,902,612 A | 9/1959 | Whearley |
| 2,937,803 A | 5/1960 | Cunningham |
| 3,077,252 A | 2/1963 | Treer |
| 3,167,673 A | 1/1965 | Miguel et al. |
| 3,202,252 A | 8/1965 | Schilling |
| 3,209,184 A | 9/1965 | Woodward, Jr. |
| 3,229,132 A | 1/1966 | Cohen et al. |
| 3,253,687 A | 5/1966 | Young |
| 3,291,273 A | 12/1966 | Hansen |
| 3,303,367 A | 2/1967 | Jaeschke et al. |
| 3,312,319 A | 4/1967 | Carroll et al. |
| 3,353,641 A | 11/1967 | Chana |
| 3,382,384 A | 5/1968 | Hulls |
| 3,396,909 A | 8/1968 | Seifert |
| 3,403,275 A | 9/1968 | Little |
| 3,409,305 A | 11/1968 | Nieland |
| 3,450,910 A | 6/1969 | Jaeschke et al. |
| 3,456,141 A | 7/1969 | Burgess |
| 3,458,122 A | 7/1969 | Andriussi et al. |
| 3,468,402 A | 9/1969 | Edwards |
| 3,478,239 A | 11/1969 | Jaeschke |
| 3,488,535 A | 1/1970 | Baermann |
| 3,488,536 A | 1/1970 | Baermann |
| 3,566,168 A | 2/1971 | Matsubara et al. |
| 3,601,641 A | 8/1971 | Baermann |
| 3,684,397 A | 8/1972 | Elmer |
| 3,687,397 A | 8/1972 | Suzuki et al. |
| 3,709,342 A | 1/1973 | Spencer |
| 3,742,270 A | 6/1973 | Jaeschke |
| 3,762,517 A | 10/1973 | Hanks |
| 3,896,911 A | 7/1975 | Beneke |
| 3,974,408 A | 8/1976 | Fehr et al. |
| 4,094,393 A | 6/1978 | Spokas |
| 4,132,301 A | 1/1979 | Zabonick |
| 4,138,618 A | 2/1979 | Jaeschke |
| 4,139,085 A | 2/1979 | Kanbe et al. |
| 4,199,048 A | 4/1980 | Ishikawa |
| 4,226,095 A | 10/1980 | Loken |
| 4,231,457 A | 11/1980 | Cornish |
| 4,355,710 A | 10/1982 | Schilling |
| 4,358,695 A | 11/1982 | MacDonald et al. |
| 4,378,061 A | 3/1983 | Schierling et al. |
| 4,379,242 A | 4/1983 | MacDonald |
| 4,400,638 A | 8/1983 | Albrecht et al. |
| 4,408,685 A | 10/1983 | Schilling et al. |
| 4,410,819 A | 10/1983 | Kobayashi et al. |
| 4,418,807 A | 12/1983 | Raines |
| 4,423,803 A | 1/1984 | Malloy |
| 4,425,993 A | 1/1984 | Schilling |
| 4,446,391 A | 5/1984 | Sekine et al. |
| 4,450,947 A | 5/1984 | Hanks |
| 4,456,110 A | 6/1984 | Hanks et al. |
| 4,460,079 A | 7/1984 | Hanks |
| 4,476,410 A | 10/1984 | Wolcott |
| 4,483,430 A | 11/1984 | Carmichael et al. |
| 4,488,627 A | 12/1984 | Streich et al. |
| 4,498,066 A | 2/1985 | Fujiwara et al. |
| 4,499,409 A | 2/1985 | Bauer |
| 4,508,985 A | 4/1985 | Pavlik et al. |
| 4,526,257 A | 7/1985 | Mueller |
| 4,534,454 A | 8/1985 | Brooks |
| 4,540,381 A | 9/1985 | Molloy et al. |
| 4,541,516 A | 9/1985 | Fenzel |
| 4,555,239 A | 11/1985 | Miranti, Jr. |
| 4,564,775 A | 1/1986 | Mazzorana |
| 4,570,849 A | 2/1986 | Klaucke et al. |
| 4,576,266 A | 3/1986 | Schilling et al. |
| 4,630,718 A | 12/1986 | Hanks |
| 4,633,991 A | 1/1987 | Hanks et al. |
| 4,648,493 A | 3/1987 | Schilling et al. |
| 4,657,126 A | 4/1987 | Hanks et al. |
| 4,679,675 A | 7/1987 | Hanks et al. |
| 4,683,392 A | 7/1987 | MacDonald et al. |
| 4,688,951 A | 8/1987 | Guers |
| 4,696,378 A | 9/1987 | Brooks |
| 4,718,526 A | 1/1988 | Koitabashi |
| 4,750,595 A | 6/1988 | Dayen et al. |
| 4,766,986 A | 8/1988 | Dayen et al. |
| 4,770,281 A | 9/1988 | Hanks |
| 4,830,161 A | 5/1989 | Hall et al. |
| 4,846,315 A | 7/1989 | Dayen |
| 4,846,326 A | 7/1989 | Tilton et al. |
| 4,857,785 A | 8/1989 | McCarty |
| 4,872,535 A | 10/1989 | Dayen et al. |
| 4,877,117 A | 10/1989 | Kniebel et al. |
| 4,907,683 A | 3/1990 | Patel |
| 4,926,992 A | 5/1990 | Linnig |
| 4,934,500 A | 6/1990 | Hanks et al. |
| 4,989,708 A | 2/1991 | Gaggermeier |
| 4,997,074 A | 3/1991 | Larson et al. |
| 5,052,988 A | 10/1991 | Ishikawa et al. |
| 5,059,161 A | 10/1991 | Bredt |
| 5,105,928 A | 4/1992 | Saeki et al. |
| 5,145,038 A | 9/1992 | Kuwahara |
| 5,215,175 A | 6/1993 | Fenzel |
| 5,219,050 A | 6/1993 | Kubomiya |
| 5,226,517 A | 7/1993 | Grochowski |
| 5,234,090 A | 8/1993 | Haka |
| 5,238,095 A | 8/1993 | Pedu |
| 5,242,036 A | 9/1993 | Hennessy et al. |
| 5,284,230 A | 2/1994 | Takaki |
| 5,301,779 A | 4/1994 | Nash |
| 5,355,983 A | 10/1994 | Radomski et al. |
| 5,363,912 A | 11/1994 | Wolcott |
| 5,398,794 A | 3/1995 | Walberg et al. |
| 5,558,495 A | 9/1996 | Parker et al. |
| 5,586,635 A | 12/1996 | Nelson et al. |
| 5,586,636 A | 12/1996 | Linnig |
| 5,611,415 A | 3/1997 | Davis et al. |
| 5,613,586 A | 3/1997 | Schilling et al. |
| 5,624,016 A | 4/1997 | Coulter et al. |
| 5,636,719 A | 6/1997 | Davis et al. |
| 5,704,461 A | 1/1998 | Vatsaas et al. |
| 5,746,580 A | 5/1998 | Parker et al. |
| 5,947,248 A | 9/1999 | Link |
| 5,994,810 A | 11/1999 | Davis et al. |
| 6,013,003 A | 1/2000 | Boffelli et al. |
| 6,025,664 A * | 2/2000 | Kuwahara ........................ 310/77 |
| 6,092,638 A | 7/2000 | Vatsaas |
| 6,098,771 A | 8/2000 | Vu |
| 6,109,871 A | 8/2000 | Nelson et al. |
| 6,129,193 A | 10/2000 | Link |
| 6,176,355 B1 | 1/2001 | Yamamoto |
| 6,328,142 B1 | 12/2001 | Kuwahara |
| 6,520,304 B2 | 2/2003 | Bellotti et al. |
| 6,548,929 B2 | 4/2003 | Nelson et al. |
| 6,838,796 B1 | 1/2005 | Nelson |
| 6,911,756 B1 * | 6/2005 | Chang ........................ 310/156.01 |

(56) References Cited

U.S. PATENT DOCUMENTS

| | | | |
|---|---|---|---|
| 7,104,382 | B2 | 9/2006 | Swanson et al. |
| 7,201,267 | B2 | 4/2007 | Swanson et al. |
| 7,311,189 | B2 | 12/2007 | Swanson et al. |
| 7,438,169 | B2 | 10/2008 | Swanson et al. |
| 7,553,764 | B2 | 6/2009 | MacNamara et al. |
| 7,604,106 | B2 | 10/2009 | Swanson et al. |
| 8,100,239 | B2 | 1/2012 | Swanson et al. |
| 8,544,627 | B2 * | 10/2013 | Lawrence et al. ............ 192/48.2 |
| 2002/0046915 | A1 | 4/2002 | Inoue et al. |
| 2002/0112932 | A1 | 8/2002 | Gradu |
| 2006/0151278 | A1 | 7/2006 | Settineri |
| 2006/0254873 | A1 | 11/2006 | Swanson et al. |
| 2007/0024141 | A1 * | 2/2007 | Drexlmaier .............. 310/156.19 |
| 2007/0137974 | A1 | 6/2007 | Swanson et al. |
| 2008/0024018 | A1 * | 1/2008 | Rignault et al. ................ 310/42 |
| 2008/0029362 | A1 | 2/2008 | Swanson et al. |
| 2008/0093945 | A1 * | 4/2008 | Gruenhagen ............ 310/156.19 |
| 2009/0014273 | A1 | 1/2009 | Swanson et al. |
| 2009/0183963 | A1 | 7/2009 | Swanson et al. |
| 2009/0236196 | A1 | 9/2009 | Swanson et al. |

FOREIGN PATENT DOCUMENTS

| | | |
|---|---|---|
| DE | 1020242 | 11/1957 |
| DE | 1020243 | 11/1957 |
| DE | 1188191 | 3/1965 |
| DE | 1613060 | 1/1971 |
| DE | 26253459 | 6/1978 |
| DE | 2821973 | 11/1978 |
| DE | 3203143 A1 | 8/1983 |
| DE | 3443523 A1 | 6/1986 |
| DE | 3443524 A1 | 6/1986 |
| DE | 3915065 A1 | 11/1989 |
| DE | 4121240 A1 | 1/1993 |
| DE | 4207709 A1 | 9/1993 |
| DE | 4207710 A1 | 9/1993 |
| EP | 0202749 A1 | 11/1986 |
| FR | 2355205 | 1/1978 |
| FR | 2375494 | 7/1978 |
| GB | 1077724 | 8/1967 |
| GB | 1268444 | 3/1972 |
| GB | 2054279 A | 2/1981 |
| JP | 59226721 A | 12/1984 |
| JP | 61130630 | 6/1986 |
| JP | 8200404 A | 8/1996 |
| JP | 9074777 A | 3/1997 |
| JP | 2000289446 A | 10/2000 |
| JP | 2000358358 A | 12/2000 |
| JP | 2002233131 A | 8/2002 |
| SU | 731918 | 5/1980 |
| WO | WO9622630 A1 | 7/1996 |
| WO | WO9847215 A1 | 10/1998 |
| WO | WO2007109278 A1 | 9/2007 |

OTHER PUBLICATIONS

Concepts NREC Product Brochure, "Convert Any Horton Drive Master to a 2-Speed Fan Drive With a Concepts NREC H5200 2-Speed Fan Drive Kit" (5 pages) (2008).
Concepts NREC, "Multi-Speed Fan Clutch-Applications," at <http://www.conceptsnrec.com/clutch-apps.html> (2009).
Kit Masters, "2-Sped Conversion Kits", (p. 10) (Jul. 2009).
"Eddy Current", publication name unknown, publication date unknown (faxed Feb. 4, 1994) (3 pages).
"Welcome to KitMasters," [online], Kit Masters, 2004, [retrieved on Dec. 14, 2000]. Retrieved from the Internet: <URL.www.kit-masters.com>, 7 pages.
"Fan Clutch Overhaul Instructions," Kit Masters, Ramsey, MN, 7 pages, date unknown.
"Kysor On/Off Diagnostic Guide," Borg Warner, http://www.ets.borgwarner.com, 2 pages, Jun. 2002.
"Fail Safe™ On/Off K22FA Front Air Fan Drives," Quik-Kool™ Cooling System Components, 20 pages, Jun. 2002.
"Fail Safe™ On/Off K22RA Rear Air Fan Clutch Service Guide," Quik-Kool™ Cooling System Components, 2 pages, Jun. 2002.
"Fail Safe™ On/Off K22FA Front Air Fan Clutch Service Guide," Quik-Kool™ Cooling System Components, 2 pages, Jun. 2002.
"Fail Safe™ On/Off K22RA/K22FA Front Air/Rear Air Lining Replacement," Quik-Kool™ Cooling System Components, 2 pages, Jun. 2002.
"Fail Safe™ On/Off K22RA/K26RA Rear Air Fan Clutch Replacement," Quik-Kool™ Cooling System Components, 2 pages, Jun. 2002.
"Fail Safe™ On/Off K22FA Front Air Line Installation," Quik-Kool™ Cooling System Components, 2 pages, Jun. 2002.
"Fail Safe™ On/Off K22RA/K26RA Fan Hub Series 1077," Quik-Kool™ Cooling System Components, 4 pages, Jun. 2002.
"Fail Safe™ On/Off K26RA Rear Air Lining Replacement," Quik-Kool™ Cooling System Components, 2 pages, Jun. 2002.
"Fail Safe™ On/Off K26RA Rear Air Fan Clutch Series 1090-09500," Quik-Kool™ Cooling System Components, 6 pages, Jun. 2002.
"Fail Safe™ On/Off K22RA Rear Air Clutch Series, 1090-08500," Quik-Kool™ Cooling System Components, 8 pages, Jun. 2002.
"Drive Master® Spring-Engaged Fan Drives," Horton Product Catalogs, http://www.hortoninc.com/products/products.asp, printed from the Internet on Oct. 27, 2005, 2 pages.
"Drive Master® Reman Spring-Engaged Fan Drives," Horton Product Catalogs, http://www.hortoninc.com/products/products.asp, printed from the Internet on Oct. 27, 2005, 2 pages.
"Drive Master® Two-Speed Fan Drives," Horton Product Catalogs, http://www.hortoninc.com/products/products.asp, printed from the Internet on Oct. 27, 2005, 2 pages.
"Drive Master® PolarExtreme Spring-Engaged Fan Drives," Horton Product Catalogs, http://www.hortoninc.com/products/products.asp, printed from the Internet on Oct. 27, 2005, 2 pages.
"HT/S Advantage™ Air-Engaged Fan Drives," Horton Product Catalogs, http://www.hortoninc.com/products/products.asp, printed from the Internet on Oct. 27, 2005, 2 pages.
"Advantage Reman® Remanufactured Air-Engaged On/Off Fan Drives," http://www.hortoninc.com/products/products.asp, printed from the Internet on Oct. 27, 2005, 2 pages.
"PolarExtreme HT/S Reman Fan Drives," http://www.hortoninc.com/products/products.asp, printed from the Internet on Oct. 27, 2005, 2 pages.
"Klondike® Series Replacement Fan Clutches for K22RA Kits for Kysor's K22RA and K22FA," http://www.hortoninc.com/products/products.asp, printed from the Internet on Oct. 27, 2005, 3 pages.
"Klondike® Series Replacement Fan Clutch for Kysor's K22RA," Horton, Inc., 2 pages 2004.
"Bendix® FD-L™ Fan Clutch," Bendix Service Data SD-09-8505, 8 pages, Apr. 2004.
"Bendix® FD-1™ Clutch Type Fan Drive," Bendix Service Data Sd-09-8501, 8 pages, Apr. 2004.
"Bendix® FD-2™ Clutch Type Fan Drive," Bendix Service Data SD-09-8503, 8 pages, Apr. 2004.
"Bendix® FD-3™ TorqueMaster Fan Clutch," Bendix Service Data Sd-09-8504, 8 pages, Apr. 2004.
Bendix Catalog Index, 20 pages, date unknown.
Horton Catalog, 70 pages, Mar. 1998.
"The Kysor K-22RA Fail Safe™ On-Off Fan Clutch," BorgWarner Cooling Systems, Apr. 2000, 2 pages.
"K-22RA Fan Drive," Kysor Cadillac, 20 pages, Jul. 1996.
Engine Cooling Fans. Fan Spacers & Adapters, Horton, Inc., pp. 47-48, Jun. 2002.
"Installation and Service Guide—Kysor Front Air Fan Drives," Kysor Cooling Systems N.A., 24 pages, Oct. 1998.
BorgWarner 2004 Product Catalog, front and back covers and pp. 92-256 and 341-389.
Horton Heavy-Duty Vehicle Components Catalog, Jul. 2004, front and back covers and Table of Contents, pp. I-V.
Shigley et al., Power Transmission Elements—A Mechanical Designer's Workbook, 1990, New York, McGraw-Hill, pp. 76, 91-95.

* cited by examiner

TWO-SPEED CLUTCH AND KIT

CROSS-REFERENCE TO RELATED APPLICATION(S)

The present application is a continuation of U.S. patent application Ser. No. 13/124,760, entitled "Two-Speed Clutch and Retro-Fit Kit," filed Apr. 18, 2011, which is a §371 national-phase application of PCT Application PCT/US2009/064168, filed Nov. 12, 2009, which claims priority to U.S. Provisional Patent Application No. 61/198,965, entitled "Two-Speed Clutch and Retro-Fit Kit" filed Nov. 12, 2008, and U.S. Provisional Patent Application No. 61/210,394, entitled "Two-Speed Clutch and Retro-Fit Kit" filed Mar. 18, 2009, all of which are hereby incorporated by reference in their entireties.

BACKGROUND

The present invention relates generally to clutches, and more generally to two-speed clutches suitable for automotive applications.

On/off friction clutches that provide only a single engagement speed are known, such as the DriveMaster® spring-engaged fan drive available from Horton, Inc., Roseville, Minn. Many vehicles have had such on/off friction clutches installed. Two speed clutches are also known, such as the DriveMaster® two-speed fan drive available from Horton, Inc., which utilize a spring-engaged friction clutch in conjunction with an eddy current drive that engages the drive when the spring-engaged friction clutch is disengaged to provide a second, slower engagement speed. A clutch retro-fit kit is known from U.S. Patent Application Publication No. 2009/0183963.

The present invention provides an alternative two-speed clutch, as well as a kit that allows a retrofit or conversion of an on/off clutch to a two-speed clutch.

SUMMARY

A magnet holder assembly suitable for use as an eddy current drive of a clutch includes magnet holder means for securing one or more magnets to a rotatable component of the clutch, a first permanent magnet radially retained by the magnet holder means, wherein the first permanent magnet has a beveled edge configured to mate with the magnet holder means, and a second permanent magnet radially retained by the magnet holder means. The first permanent magnet and the second permanent magnet have magnetic orientations arranged substantially opposite one another.

While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

DETAILED DESCRIPTION

Figure 1:
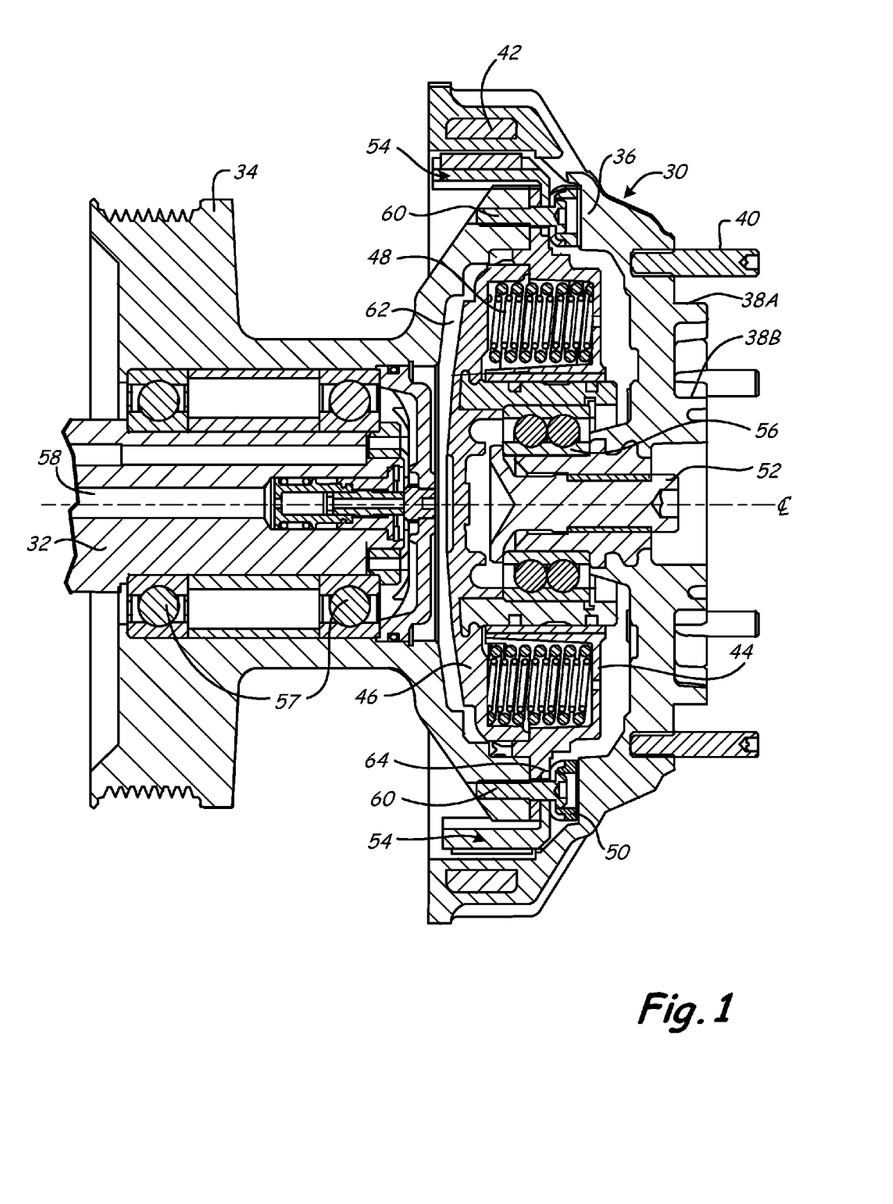
FIG. 1 is a cross-sectional view of a clutch according to the present invention.
Figure 2:
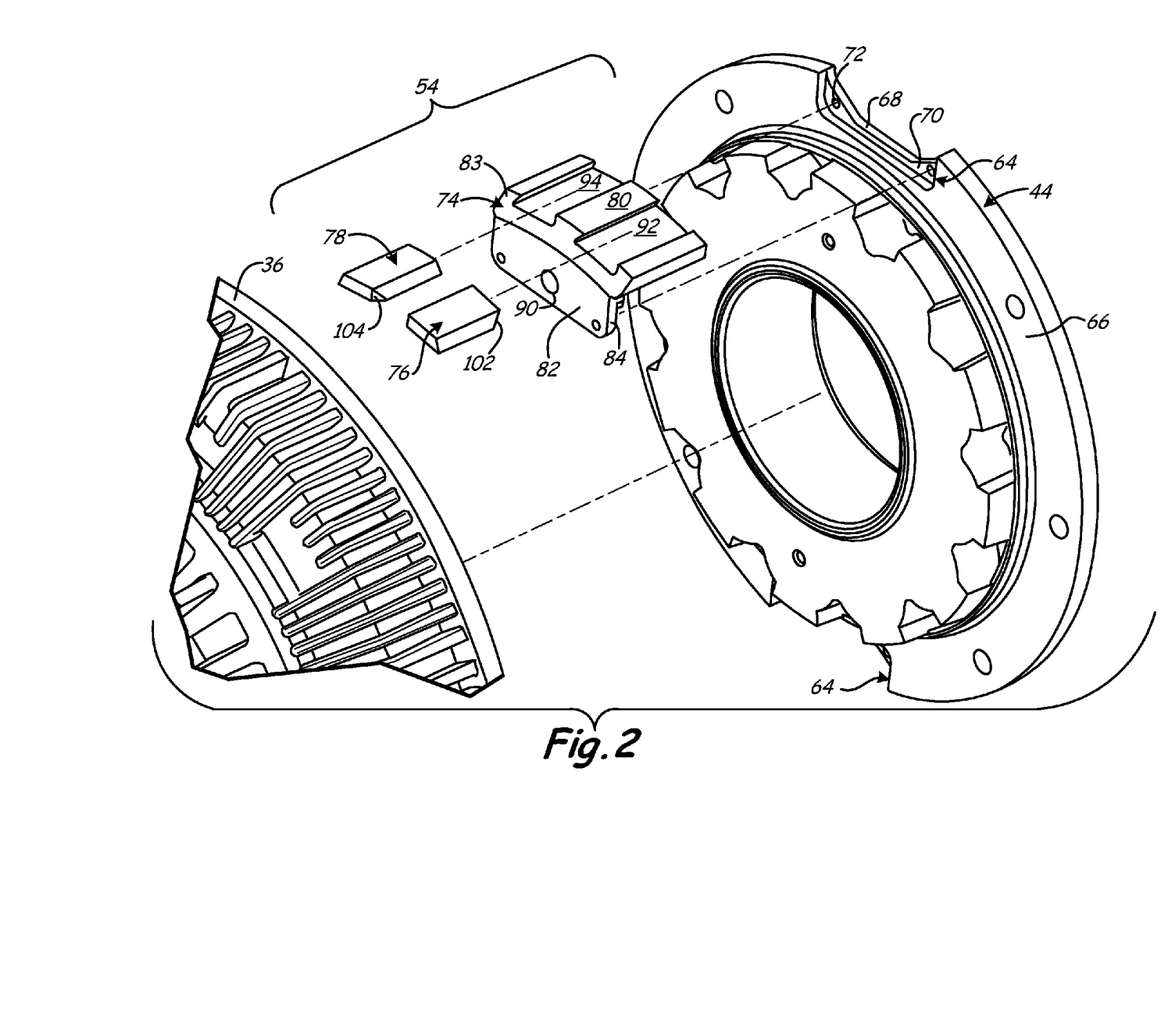
FIG. 2 is an exploded perspective view of a portion of the clutch of FIG. 1.

FIG. 1 is a cross-sectional view of an embodiment of a clutch 30 secured to a mounting bracket 32. FIG. 2 is an exploded perspective view of a portion of the clutch 30. The clutch 30 includes an input member 34 (e.g., a sheave or pulley member) and a cover 36 (also called a fan-mounted friction disk) configured relative to a centerline axis $C_L$. A belt or other structure (not shown) can be operatively engaged with the input member 34 to provide a rotational input force to rotate the input member 34. The cover 36 has pilots 38A and 38B, threaded fasteners 40, and an eddy-current conducting ring 42. The clutch 30 further includes a spring housing 44, a piston plate 46, one or more springs 48, friction material 50, a locking member 52, one or more magnet holder assemblies 54, and bearing sets 56 and 57. The mounting bracket 32 has an internal passageway 58 for supplying a pressurized fluid from a source (not shown) to the clutch 30. The clutch 30 permits the cover 36 to be selectively rotated in response to rotational input, such that during operation the cover 36 can rotate with the input member 34 at a selected speed.

A fan (not shown), or other component, can be mounted to the cover 36. The fan pilots 38A and 38B are arranged concentrically about the centerline axis $C_L$. The fan can be mounted to either fan pilot 38A or 38B, such as with a press-in fastener for the fan pilot 38B or threaded fasteners 40 for the fan pilot 38A. Other types of fasteners and fastener arrangements are possible in further embodiments. A fan spacer (not shown) can optionally be used when mounting the fan to the cover 36. The cover 36 is thus suitable to fit most common fan offsets, and can provide a neutral placement of the fan relative to surrounding cooling system components.

The input member 34 is rotatably mounted to the mounting bracket 32 by the bearing sets 37. The spring housing 44 and the friction material 50 are fixedly mounted to the input member 34 by fasteners 60, and are configured to rotate therewith. The piston plate 46 is slidably mounted and rotationally fixed relative to the spring housing 44, and is configured to rotate therewith. A fluid chamber 62 is defined at least partially between the input member 34 and the piston plate 36, and is in fluid communication with the passageway 58 through the mounting bracket 32. The springs 48 are engaged between the spring housing 44 and the piston plate 46. The cover 36 is rotatably mounted relative to the piston plate 46 by the bearing set 56. The locking member 52 releasably secures the cover 36 and the bearing set 56 to each other.

The clutch 30 in the illustrated embodiment has a two-speed configuration, with both a friction drive and an eddy current drive (also known as a hysteresis drive). When the friction drive is disengaged, the eddy current drive transmits torque to provide a rotational output at a first rotational speed, which generally is less than a rotational input speed associated with the rotational input force. When the friction drive is engaged, the frictional engagement transmits torque to provide a rotational output at a second rotational speed. Typically the second rotational speed is greater than the first rotational speed, with the second rotational speed being essentially equal to the rotational input speed. The general operation of a two-speed clutch is described in U.S. Pat. Nos. 5,613,586 and 6,838,796.

In the illustrated embodiment, the piston plate 46 is axially moveable to provide the on/off friction drive. By default, the one or more springs 44 bias the piston plate 46 away from the spring housing 44, which in turn pulls the cover 36 toward the friction material 50 such that frictional engagement between the friction material 50 and the cover 36 occurs. Frictional engagement permits torque transmission between the input member 32 and the cover 36 with the input and output speeds being approximately equal. Pressurized fluid can be selectively delivered to the fluid chamber 62 through the passageway 58 to disengage the on/off friction drive. The pressurized fluid introduced to the fluid chamber 62 can axially displace the piston plate 46, compressing the springs 48. Fluidically-induced axial displacement of the piston plate 46 against the force of the springs 48, producing a corresponding axial displacement of the cover 36, which is moved away from the friction material 50.

The eddy current drive can allow a relatively low-speed rotational engagement between the input member 54 and the cover 56 when the friction drive is disengaged. Torque transmission through eddy current engagement is facilitated by way of the ring 42 and the one or more magnet holder assemblies 54, which are described further below. In the illustrated embodiment, two substantially equally angularly spaced magnet holder assemblies 54 are provided. However, in further embodiments any number of magnet holder assemblies 54 can be utilized. The magnet holder assemblies in the illustrated embodiment are radially opposed from the ring 42, and are separated from the ring 42 of the cover 36 by a generally radial air gap, though other configurations are possible in alternative embodiments.

In the illustrated embodiment, the ring 42 is a steel insert cast into aluminum material of the cover 36, such as in the manner disclosed in U.S. Pat. No. 5,994,810. In alternative embodiments, the ring 42 can be secured to or formed as part of the cover 36 in any suitable manner, such as being mechanically attached to the cover 36 with suitable fasteners. The ring 42 forms part of the eddy current drive to complete a magnetic flux circuit during operation. It should be noted that in alternative embodiments, the ring 42 can have different orientations and be made of any material capable of conducting eddy currents. Indeed, in some alternative embodiments the ring 42 can be omitted and the eddy current drive engaged merely by at least a portion of the material (e.g., aluminum) of the cover 36.

Those of ordinary skill in the art will recognize that the clutch 30 can include additional components not specifically mentioned herein. Moreover, those of ordinary skill in the art will recognize that in alternative embodiments the on/off friction drive of the clutch 30 can be of any conventional configuration. For example, in one embodiment the on/off friction drive of the clutch 30 can be similar to that of a DriveMaster® spring-engaged, pneumatically-actuated fan drive commercially available from Horton, Inc., Roseville, Minn. In another embodiment the on/off friction drive of the clutch 30 can be similar to that described in U.S. Pat. No. 6,092,638. In various embodiments, the actuation means for the on/off friction drive can be pneumatic, hydraulic, electromagnetic, or utilize any other suitable actuation means.

Figure 3:
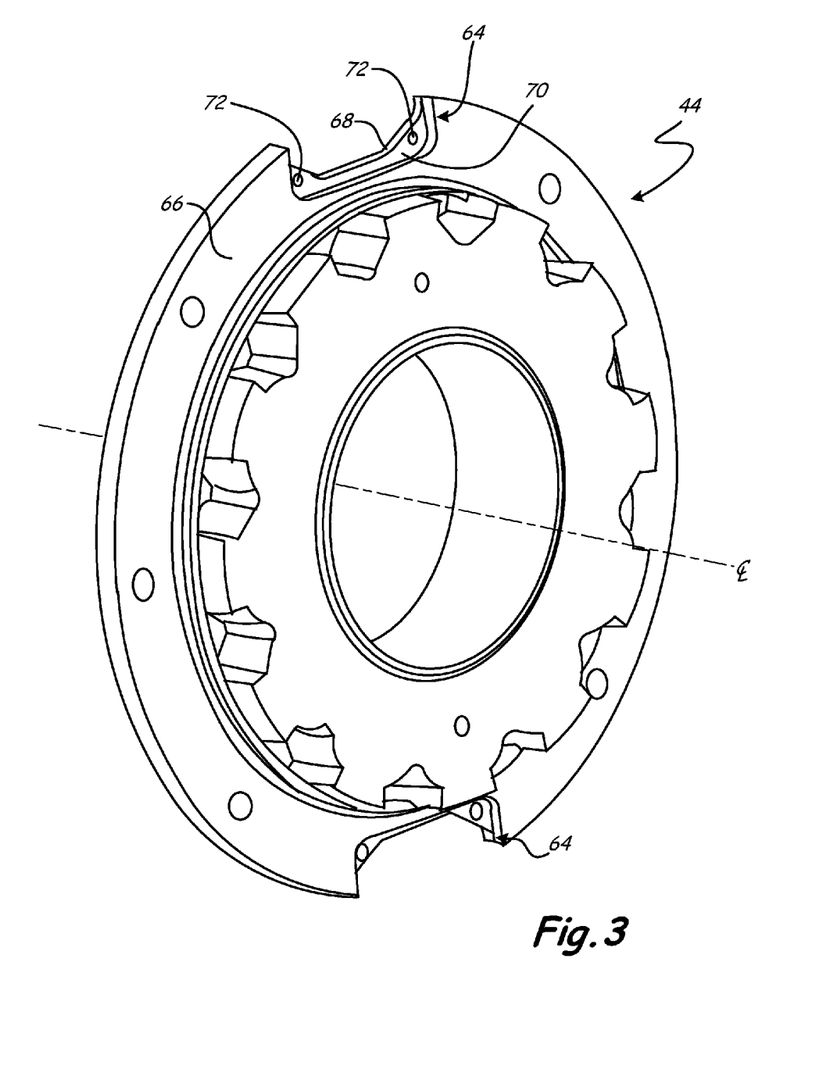
FIG. 3 is a perspective view of a spring housing of the clutch.

FIG. 3 is a perspective view of the spring housing 44. In the illustrated embodiment, the spring housing 44 includes a plurality of insets 64 to accommodate a corresponding number of the magnet holder assemblies 54. Each inset 64 is defined in an outer diameter (OD) portion 66 of the spring housing 44. The plurality of insets 64 can be angularly spaced from one another about the centerline axis $C_L$. In the illustrated embodiment two insets 64 are provided in a diametrically opposed relationship. All of the insets 64 can have the same shape, and can each include an opening 68 that extends through an entire thickness of the OD portion 66 of the spring housing 44 and an abutment portion 70 that extends only partially through part of the thickness of the OD portion 66. The opening 68 can extend to a circumferential edge of the spring housing 44. One or more retention holes 72 can be provided in the abutment portion 70. In alternative embodiments, the spring housing 44 can have the entire inset extend through the thickness of the OD portion 66 (i.e., the abutment portion 70 is omitted). In further alternative embodiments, the spring housing 44 can have insets that do not extend through the entire thickness of OD portion 66 (i.e., the openings 68 are omitted).

Figure 4:
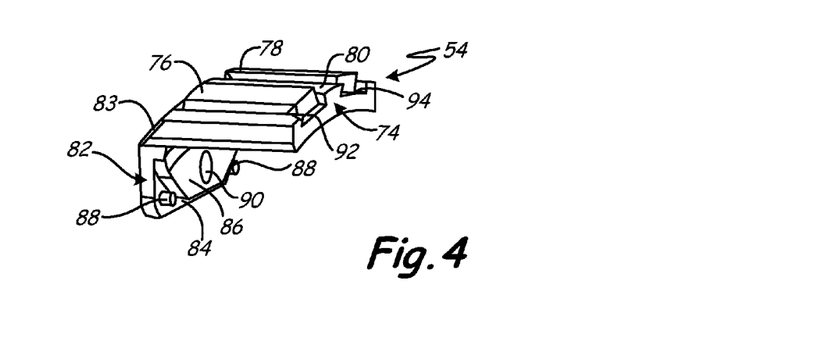
FIG. 4 is a perspective view of one embodiment of a magnet holder assembly of the clutch.
Figure 5:
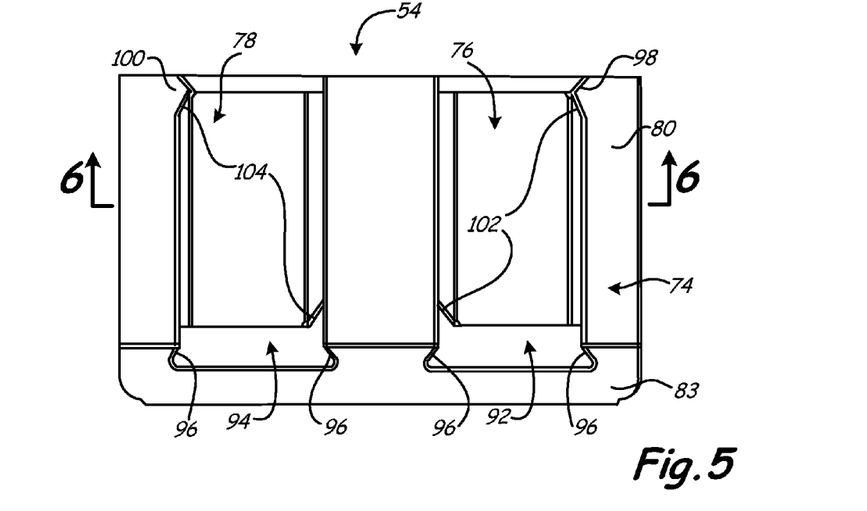
FIG. 5 is a plan view of the magnet holder assembly of FIG. 4.
Figure 6:
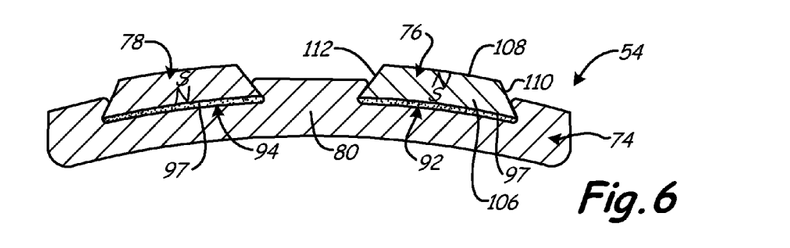
FIG. 6 is a cross-sectional view of the magnet holder assembly, taken along line 6-6 of FIG. 5.

FIG. 4 is a perspective view of one embodiment of a magnet holder assembly 54, FIG. 5 is a plan view of the magnet holder assembly 54, and FIG. 6 is a cross-sectional view of the magnet holder assembly 54, taken along line 6-6 of FIG. 5. As shown in FIGS. 4-6, the magnet holder assembly 54 includes a magnet holder 74 and first and second magnets 76 and 78, respectively. The magnet holder 74 includes a body portion 80 and a flange 82. The body portion 80 can extend in a generally axial direction, and can have an arcuate shape that follows the curvature of the OD portion 66 of the spring housing 44. In the illustrated embodiment the body portion 80 is relatively compact in size, and, for instance, is not an annular ring that circumscribes the centerline axis $C_L$, which helps to reduce weight of the clutch 30 and reduce the amount of material required to make the magnet holder 74. The flange 82 can extend from a front region of the body portion 80 in a generally radial direction. A front edge 83 of the magnet holder 74 can be beveled to allow close spacing of the cover 36.

In the illustrated embodiment, the flange 82 includes a first portion 84 and a second portion 86. The first portion 84 is generally rectangular in shape and the second portion 86 is generally trapezoidal in shape and arranged substantially parallel to the first portion 84. The insets 64 in the spring housing 44 can have a shape that generally corresponds to that of the flange 82 of the magnet holder 74, with the shape of the abutment portion 70 corresponding to that of the first portion 84 and the shape of the opening 68 corresponding to that of the second portion 86. A pair of retention features 88 extend from the first portion 84 of the flange 80 and are configured to engage the retention holes 72 in the spring housing 44, which can help secure the magnet holder 74 to the spring housing 44 in conjunction with the fastener 60 positioned through an opening 90 in the flange 82 (see FIG. 1). In the illustrated embodiment, the retention features 88 are each substantially cylindrical pin-like members that extend rearward from the first portion 84 of the flange 82 of the magnet holder 74 at opposite sides of the second portion 86. When the magnet holder assembly 54 is secured to the spring housing 44, the retention features 88 each extend at least partially into the corresponding retention holes 72 to interlock those components and provide radial retention. The retention features 88 and retention holes 72 provide redundant radial retention of the magnet holder 74 relative to the spring housing 44 as a fail-safe mechanism in the event of a failure of the fastener 60. The inset 64 of the spring housing 44 can also provide angular and radial locating features for installation of the magnet holder assemblies 54, which can facilitate assembly of the clutch 30, or likewise facilitate retro-fit installation of a two speed kit to the clutch 30.

As shown in FIGS. 4-6, the body portion 80 of the magnet holder 74 defines first and second retention grooves 92 and 94, respectively, that allow first and second magnets 76 and 78 (or any other mating components) to be engaged and radially restrained therein when subject to a centrifugal force. The grooves 92 and 94 can each have a generally dovetailed or beveled shape that mechanically obstructs radial movement of the magnets 76 and 78 while still leaving radially outward portions of the magnets 76 and 78 exposed. Sidewalls 96 of the grooves 92 and 94 can be arranged at about 30° angles with respect to radii projected from the centerline axis $C_L$, or at other angles as desired. The grooves 92 and 94 can extend between front and rear sides of the body portion 80 of the magnet holder 74 in a generally axial direction. As illustrated, the grooves 92 and 94 are substantially open at both ends, but in alternative embodiments one or both of the grooves 92 and 94 could have one end closed by material of the body portion 80.

An adhesive 97 can be used to secure each of the magnets 76 and 78 to the body portion 80 of the magnet holder 74, which can help limit movement of the magnets 76 and 78 within the grooves 92 and 94, respectively. The adhesive 97 can be Loctite® 331™ structural adhesive (available from the Henkel Corporation). Stops 98 and 100 can be provided that extend into the first and second grooves 92 and 94, respectively. In the illustrated embodiment, both stops 98 and 100 are positioned at or near a rear side of the magnet holder 74, and acts to limit axial movement of the first and second magnets 76 and 78 within the respective first and second grooves 92 and 94. Furthermore, the stop 98 is located at an outer sidewall 96 of the first groove 92 (i.e., a right hand sidewall 96 of the first groove 92 in FIG. 5), and the stop 100 is located at an opposite outer sidewall 96 of the second groove 94 (i.e., a left hand sidewall 96 of the second groove 94 in FIG. 5). The stops 98 and 100 can facilitate assembly, by simplifying alignment of the magnets 76 and 78 relative to the magnet holder 74. The stops 98 and 100 can be formed, for instance, by mechanically deflecting corners of the sidewalls 96 of the grooves 93 and 94, or by any other suitable manner.

The magnets 76 and 78 can each be made of a rare earth permanent magnet material, such as a magnetized neodymium-iron-boron material. Furthermore, the first and second magnets 76 and 78 can each optionally have a locating feature 102 and 104, respectively, configured to cooperate with the stops 98 and 100 to help ensure desired magnetic orientation (i.e., North/South pole orientation) of the magnets 76 and 78. In the illustrated embodiment, the locating features 102 and 104 are pairs of notches located at diagonally opposed corners of each of the magnets 76 and 78, respectively, and have shapes that correspond to that of the stops 98 and 100, respectively. In alternative embodiments, each of the magnets 76 and 78 can include only a single locating feature 102 and 104. The locating features 102 and 104 can be positioned at opposite sides of the magnets 76 and 78, for example, the locating features 102 are positioned at right-rear and left-forward corners of the magnet 76 and the locating features 124 are positioned at left-rear and right-forward corners of the magnet 78, as shown in FIG. 5. In this way, the locating features 102 and 104 can be associated with each of the magnets 76 and 78 to provide a physical and visual identifier of the polarity of the magnets 76 and 78, and to help ensure that the magnets 76 and 78 are installed in the respective grooves 92 and 94 with desired magnetic orientations. In the illustrated embodiment, as shown in FIG. 6, the first magnet 76 has a North pole facing radially outward and the second magnet 78 has a South pole facing radially outward, such that the magnetic orientations (i.e., polarities) of the first and second magnets 76 and 78 are substantially opposite one another, which facilitates eddy current generation between the magnet holder assembly 54 and the ring 42 during operation of the eddy current drive of the clutch 30.

The first and second magnets 76 and 78 can each be configured to have a cross-sectional profile that generally corresponds to the shape of the first and second grooves 92 and 94, respectively. In the illustrated embodiment, the first and second magnets 76 and 78 each have generally curved, trapezoidal cross-sectional profiles. More specifically, the magnets 76 and 78 can each have arcuate radially inner and radially outer surfaces 106 and 108, respectively, and beveled side surfaces 110 and 112, which can define an included angle of about 60° in one embodiment (i.e., each side surface 110 and 112 is arranged at about 30° with respect to radii projected from the centerline axis $C_L$). It should be noted that the particular configuration of the magnets 76 and 78 can vary as desired in further embodiments. The side surfaces 110 and 112 of the magnets 76 and 78 are configured to cooperatively engage and physically contact the sidewalls 96 of the grooves.

Magnets used with eddy current drives are frequently made of relatively brittle materials, which may be prone to undesirable fracturing or other damage during assembly and use. Mechanical fasteners (e.g., screws, bolts) that exert clamp-like forces on magnets may undesirably cause damage to such magnets. In the illustrated embodiment, neither the grooves 92 and 94 nor the adhesive 97 exerts a positive clamping force on the magnets 76 and 78, but the assemblies 54 reduce or eliminate the need for a mechanical fastener for retention of the magnets 76 and 78. In this way the magnet holder assemblies 54 can help to reduce or eliminate stress concentrations that would otherwise occur due to a clamp-like load exerted on the magnets 76 and 78 by fasteners. Moreover, the grooves 92 and 94 help reduce a risk of the magnets 76 and 78 dislodging due to failure of the adhesive 97 during operation. Dislodged magnets can impact other clutch components or become wedges between rotating parts, presenting an elevated risk of damage to the rest of the clutch. Moreover, loss of a magnet decreases eddy current drive operation. Redundant retention mechanisms according to the present invention help reduce such risks.

The magnet holder assemblies 54 can each be installed axially with respect to the centerline axis $C_L$ of the clutch 30. In preferred embodiments, the magnet holder assemblies 54 can each be installed from a front area of the clutch 30, allowing installation of the magnet holder assemblies 54 upon removal of, or prior to installation of, the cover 36, but without requiring that other components of the clutch 30, such as the piston plate 46, be removed or uninstalled.

Figure 7:
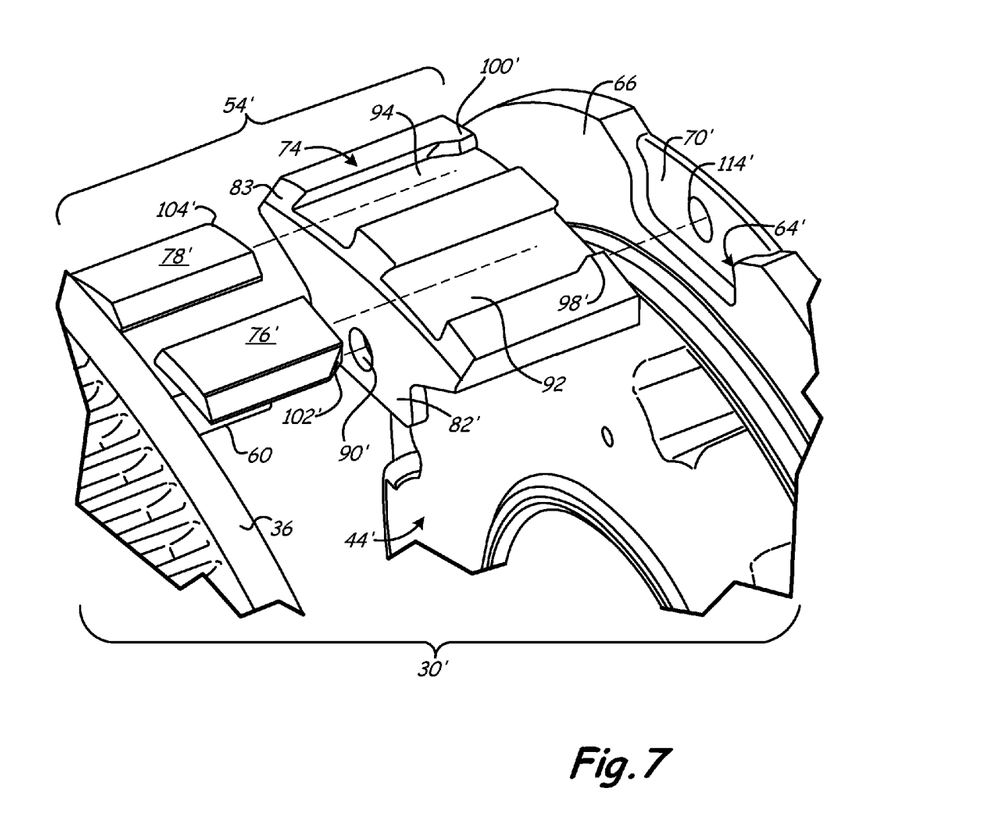
FIG. 7 is an exploded perspective view of a portion of another embodiment of a clutch according to the present invention.

FIG. 7 is an exploded perspective view of a portion of another embodiment of a clutch 30'. The clutch 30' is generally similar to the clutch 30 described above, but magnet holder assemblies 54' and a spring housing 44' have alternative configurations. In the embodiment illustrated in FIG. 7, a flange 82' of a magnet holder 74' and an inset 64' in the OD portion 66 of the spring housing 44' have corresponding dovetail shapes, which help to radially secure the magnet holder 74' to the spring housing 44' even in the event the fastener 60 engaged through the openings 90' in the flange 82 and an opening 114' in an abutment portion 70' of the inset 64' fails.

In that way, the fastener 60 and the corresponding shapes of the flange 82' and the inset 64' provide redundant engagement mechanisms as a fail-safe measure. In alternative embodiments, the flange 82' and inset 64' can have other, non-dovetail configurations. The inset 64' of the spring housing 44' can also provide angular and radial locating features for installation of the magnet holder assemblies 74', which can facilitate assembly of the clutch 30', or likewise facilitate retro-fit installation of a two speed kit to the clutch 30'.

It will be recognized that the clutch 30 or 30' can be provided as described herein as a new clutch, fully assembled and ready for installation in a desired location, such as in a vehicle. Alternatively, a two-speed kit can be provided to upgrade or retro-fit an existing single-speed on/off friction clutch to the two-speed clutch 30 or 30'. For example, an existing DriveMaster® spring-engaged fan drive providing only on/off frictional engagement can be upgraded with a two-speed kit that adds an eddy current drive. Such a kit can include the cover 36, the spring housing 44 or 44', and the magnet holder assemblies 54 or 54' described above, as well as additional components as desired. In general, installation of the two-speed kit can involve replacement of an existing cover with the cover 36, though it may be possible in some embodiments to continue use of an existing cover or use a new cover without the ring 42 as described above. Additionally, an existing spring housing can be replaced with the spring housing 44 or 44' described above, with the one or more magnet holder assemblies 54 or 54' installed on the spring housing 44 or 44'. Such a two-speed kit allows a single-speed on/off clutch to be converted to a two-speed configuration without incurring any additional length penalty, allowing the clutch 50 to acquire an additional engagement speed while remaining relatively compact. Compact clutch sizes can be important given space constraints of many applications, such as installation within a vehicle engine compartment.

Figure 8:
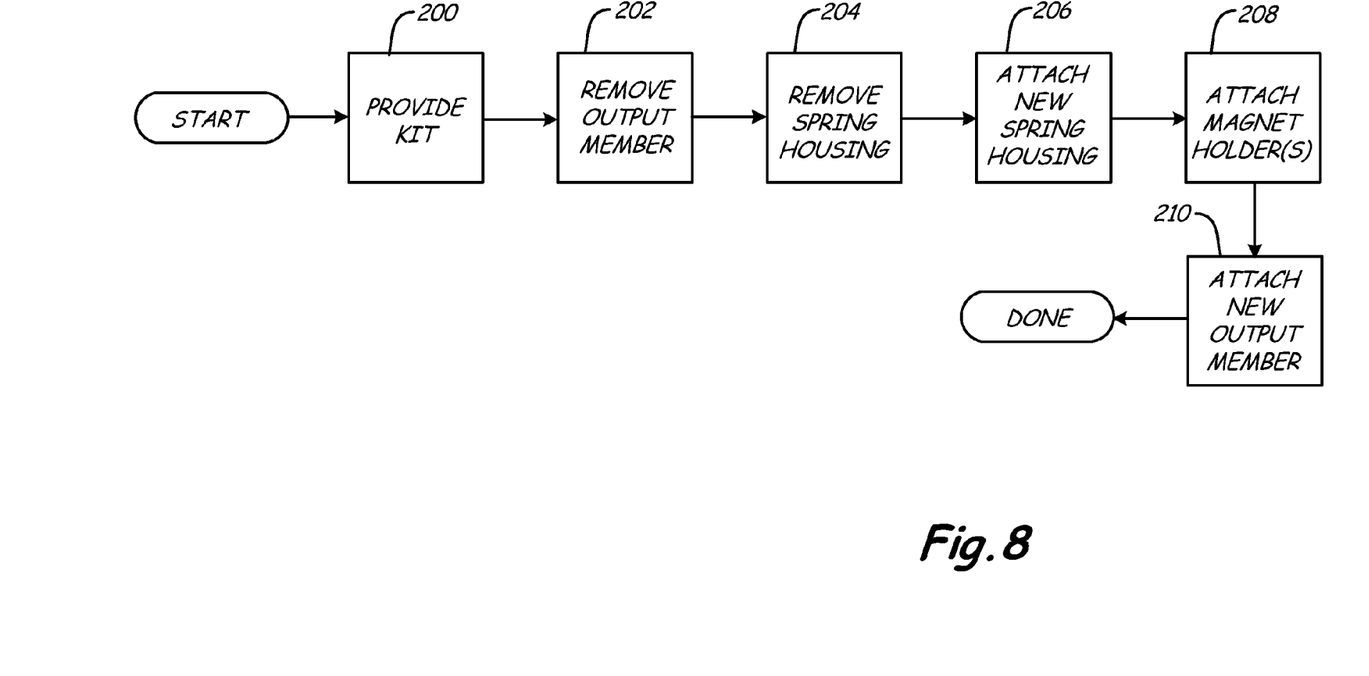
FIG. 8 is a flow chart illustrating a method of retro-fitting a clutch according to the present invention.

FIG. 8 is a flow chart illustrating a method of retro-fitting an existing single-speed on/off clutch with an eddy current drive add-on kit to produce a two-speed clutch. A kit is provided for use with an existing clutch (step 200). An existing output member (e.g., a fan mounted friction disk) of the clutch is removed (step 202), which can include releasing a locking member. An existing spring housing is also removed from the clutch (step 204), which can include removing fasteners. A piston member and other components of the clutch can generally remain in place as the output member and the spring housing are removed, as desired. Next, a new spring housing having inset features is attached to the clutch (step 206) and all magnet holder assemblies are attached to the new spring housing at the corresponding insets (step 208). Steps 206 and 208 can be performed in any order, as desired. Finally, a new output member is attached to the clutch (step 210). As noted above, in alternative embodiments the existing output member can be re-attached to the clutch. It should also be noted that components referred to herein as "new" can include previously unused, refurbished or salvaged parts.

It will be recognized that the present invention provided numerous advantages and benefits. For example, the addition of a two-speed kit to an existing single-speed on/off friction clutch according to the present invention can produce a zero overall length penalty, that is, the overall axial dimension of the clutch can remain essentially constant upon the installation of the two-speed kit. The two-speed kit thereby provides convenient means of utilizing existing on/off friction clutch designs with added versatility of the two-speed kit design improvements. This also allows users to upgrade existing clutches at relatively low costs, because existing on/off friction clutch components and an existing fan can be re-used.

Moreover, the magnet holders of the present invention utilize adhesive and special part geometries to help radially retain the permanent magnets without undesirable clamp loads, and attachments of various components are made with redundant retention mechanisms to help provide fail-safe operation. In addition, the present invention provides for relatively easy assembly or relatively easy retro-fitting of an existing clutch.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, additional clutch drives can be included for providing more than two engagement speeds. Moreover, magnet holder assemblies of the present invention can include more or less than two magnets, and any number of magnet holder assemblies can be provided.

The invention claimed is:

1. A magnet holder assembly suitable for use as an eddy current drive of a clutch, the assembly comprising:
   magnet holder means for securing one or more magnets to a rotatable component of the clutch;
   retention means for radially retaining the magnet holder assembly relative to the clutch, wherein the retention means comprises a dovetailed flange;
   a first permanent magnet radially retained by the magnet holder means, wherein the first permanent magnet has a beveled edge configured to mate with the magnet holder means; and
   a second permanent magnet radially retained by the magnet holder means, wherein the first permanent magnet and the second permanent magnet have magnetic orientations arranged substantially opposite one another.

2. The assembly of claim 1, wherein magnet holder means comprises a body having a first groove, and wherein the first groove has an angled sidewall configured to help retain the first permanent magnet along the beveled edge.

3. The assembly of claim 1 and further comprising:
   second retention means for radially retaining the magnet holder assembly relative to the clutch, wherein the second retention means are spaced from the first retention means.

4. The assembly of claim 1 and further comprising:
   a first angled stops located along a first groove in the magnet holder means;
   a second angled stop located along a second groove in the magnet holder means;
   a first corner notch on the first permanent magnet; and
   a second corner notch on the second permanent magnet, wherein the first and second corner notches are arranged at different corners of the first and second magnets such that the first corner notch can engage the first angled stop but not the second angled stop and such that the second corner notch can engage the second angled stop but not the first angled stop.

5. A magnet holder assembly suitable for use as an eddy current drive of a clutch, the assembly comprising:
   magnet holder means for securing one or more magnets to a rotatable component of the clutch;

retention means for radially retaining the magnet holder assembly relative to the clutch, wherein the retention means comprises a pin-like member extending substantially axially from a flange;

a first permanent magnet radially retained by the magnet holder means, wherein the first permanent magnet has a beveled edge configured to mate with the magnet holder means; and a second permanent magnet radially retained by the magnet holder means, wherein the first permanent magnet and the second permanent magnet have magnetic orientations arranged substantially opposite one another.

6. The assembly of claim 5 and further comprising:
a fastener opening in the flange.

7. A clutch apparatus comprising:
a housing rotatably fixed relative to an input member;
a cover rotatably mounted relative to the input and axially moveable relative to the input, wherein at least a portion of the cover comprises a material capable of conducting eddy currents;
a first magnet holder removably attached to the housing and rotatably fixed relative to the housing, the first magnet holder comprising:
 a body portion, wherein a first retention groove is defined in the body portion, and wherein the body portion of the first magnet holder has a curved configuration; and
 a flange extending from the body portion opposite the first retention groove, wherein the flange has a connection feature for securing the first magnet holder to the housing; and
a first permanent magnet carried by the first retention groove in the first magnet holder, wherein the first retention groove restricts movement of the first permanent magnet in a radial direction while providing a magnet access passage in another direction through which the first permanent magnet can pass, and wherein the first permanent magnet is positioned in an opposing relationship relative to the material of the cover capable of conducting eddy currents,
wherein axial movement of the cover selectively engages and disengages a frictional torque coupling between cover and the input member, and
wherein in a frictionally disengaged axial position the cover is configured to rotate with the input by way of an eddy current coupling at a speed different from that provided by the frictional torque coupling.

8. The clutch apparatus of claim 7, the housing further comprising:
a first inset, wherein the flange of the first magnet holder engages the first inset to attach the first magnet holder to the housing.

9. The clutch apparatus of claim 8, wherein the first inset is located at an outer diameter portion of the housing and has a first portion and a second portion, wherein the second portion of the inset extends between opposite faces of the housing, the second portion of the inset having a shape corresponding to that of the second portion of the flange of the first magnet holder, and wherein the first portion of the inset is located adjacent to the second portion of the inset and is configured as a recess at one face of the housing, the first portion of the inset having a shape corresponding to that of the first portion of the flange of the first magnet holder.

10. The clutch apparatus of claim 7, wherein the first retention groove comprises a dovetail shaped groove in the body portion of the first magnet holder, and wherein the first permanent magnet has a shape that is complementary with that of the first retention groove.

11. The clutch apparatus of claim 7 and further comprising:
a first retention feature on one of the housing and the flange of the first magnet holder, wherein the first retention feature is a pin member extending from the flange; and
an opening on the other of the housing and the flange of the first magnet holder, wherein the first retention feature extends at least partially into the opening to help retain the first magnet holder assembly relative to the housing.

12. The clutch apparatus of claim 7 and further comprising:
a stop located on the body portion of the magnet holder at or adjacent to the first retention groove.

13. The clutch apparatus of claim 12 and further comprising:
a locating feature on the first permanent magnet configured for cooperative engagement with the stop when the first permanent magnet is engaged with the first groove only when the first permanent magnet is arranged with a first magnetic orientation.

14. The clutch apparatus of claim 7 and further comprising:
a second retention groove defined in the body portion of the first magnet holder adjacent to the first retention groove; and
a second permanent magnet engaged with the second retention groove, wherein the first permanent magnet and the second permanent magnet have magnetic orientations arranged substantially opposite one another.

15. The clutch apparatus of claim 7, wherein the portion of the cover that comprises the material capable of conducting eddy currents comprises a conducting ring embedded in or secured to a body portion of the cover.

16. The clutch apparatus of claim 7, wherein the cover comprises an aluminum material, and wherein portion of the cover that comprises the material capable of conducting eddy currents comprises a portion of the aluminum material.

17. The clutch apparatus of claim 7, wherein the first retention groove of the first magnet holder extends in a generally axial direction.

18. The clutch apparatus of claim 7 and further comprising:
securing means for limiting permanent magnet movement through the magnet access passage.

19. A clutch apparatus comprising:
a housing rotatably fixed relative to an input member;
a cover rotatably mounted relative to the input and axially moveable relative to the input, wherein at least a portion of the cover comprises a material capable of conducting eddy currents;
a first magnet holder removably attached to the housing with a first fastener and rotatably fixed relative to the housing, the first magnet holder defining a first retention groove, wherein the first fastener further secures the housing to the input member;
a first permanent magnet carried by the first retention groove in the first magnet holder, wherein the first retention groove restricts movement of the first permanent magnet in a radial direction while providing a magnet access passage in another direction through which the first permanent magnet can pass, and wherein the first permanent magnet is positioned in an opposing relationship relative to the material of the cover capable of conducting eddy currents; and
a second magnet holder removably attached to the housing with a second fastener and rotatably fixed relative to the housing, wherein the second magnet holder is circumferentially spaced from the first magnet holder, and wherein the second magnet holder carries one or more additional permanent magnets, wherein axial movement of the cover selectively engages and disengages a frictional torque coupling between cover and the input member, and wherein in a frictionally disengaged axial position the cover is configured to rotate with the input by way of an eddy current coupling at a speed different from that provided by the frictional torque coupling.

\* \* \* \* \*